UNITED STATES PATENT OFFICE.

THOMAS COBLEY, OF HAHL, BAVARIA.

IMPROVEMENT IN THE TREATMENT OF METALLIC SILICATES AND THE MANUFACTURE OF HYDROFLUOSILICIC ACID.

Specification forming part of Letters Patent No. 38,285, dated April 28, 1863.

*To all whom it may concern:*

Be it known that I, THOMAS COBLEY, of Hahl, Bavaria, proprietor of mines, have invented an invention of an improved process for the treatment of silicates of metallic and non-metallic bases in order to recover such bases and simultaneous production of hydrofluosilicic acid; and I do hereby declare that the following specification is a description of my invention sufficient to enable those skilled in the art to practice it.

I propose to accomplish the desilicizing of the silicates of the metallic and non-metallic bases, natural and artificial, and the manufacture of hydrofluosilicic acid, by means of what I term the "fluoric process." The natural silicates to be operated upon are silver, copper, tin, chrome, cobalt, bismuth, potash, soda, or any other natural or artificial existing and available ones, either existing as a chemical combination or as a minute mechanical envelopment of an oxide or compound of the base in silicious matter. I propose also to operate upon artificial silicates, as slags and scoriæ.

The silicates, either natural or artificial, have first to be reduced to a fine powder, and then mixed with the chemical equivalent of fluoride of calcium and sulphuric or any other available acid. The whole is then brought into a retort and heated until chemical action is induced. The fluorine liberated enters into combination with the silica of the base or bases and passes in a gaseous form as hydrofluosilicic acid, which, being condensed in water, will deposit about one-third of the silica taken up in a gelatinous state. The bases thus deprived of their silica may be separated from the sulphate of lime or salt resulting from the action of the acid employed upon the base of the fluoric compound used by any known or available means and applied to the various purposes for which they are adapted.

The fluosilicic acid may be applied to purposes of the arts, and the gelatinous silica or mineral gelatine which is deposited may be employed in the manufacture of porcelain and cement.

Having now described my invention and how the same is carried out in practice, I wish it understood that what I claim, and desire secured to me by the before in part recited Letters Patent, is—

1. The application of fluorine for desilicizing metallic bases, as herein described and set forth.

2. The manufacture and production of fluosilicic acid and silica by the same process simultaneously and in combination with the process for desilicizing mineral products, in the manner herein described and set forth.

TH. COBLEY.

Witnesses:
SAMUEL ARCHBUTT,
H. WM. WELCH.